(12) United States Patent
Liebert

(10) Patent No.: US 12,115,971 B2
(45) Date of Patent: Oct. 15, 2024

(54) HYBRID DRIVETRAIN, HYBRID GEARBOX, AND METHOD FOR OPERATING SAME

(71) Applicant: Bayerische Motoren Werke Aktiengesellschaft, Munich (DE)

(72) Inventor: Sebastian Liebert, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 290 days.

(21) Appl. No.: 17/774,003

(22) PCT Filed: Nov. 3, 2020

(86) PCT No.: PCT/EP2020/080724
§ 371 (c)(1),
(2) Date: May 3, 2022

(87) PCT Pub. No.: WO2021/104801
PCT Pub. Date: Jun. 3, 2021

(65) Prior Publication Data
US 2022/0388494 A1     Dec. 8, 2022

(30) Foreign Application Priority Data

Nov. 27, 2019   (DE) .................... 10 2019 132 073.9

(51) Int. Cl.
*B60W 20/30*     (2016.01)
*B60K 6/365*     (2007.10)
(Continued)

(52) U.S. Cl.
CPC ............. *B60W 20/30* (2013.01); *B60K 6/365* (2013.01); *B60K 6/445* (2013.01); *B60K 6/547* (2013.01);
(Continued)

(58) Field of Classification Search
CPC ...... B60W 20/30; B60W 10/06; B60W 10/08; B60W 10/111; B60W 10/115;
(Continued)

(56) References Cited

U.S. PATENT DOCUMENTS

| | | |
|---|---|---|
| 2008/0120001 A1 | 5/2008 | Heap |
| 2009/0069147 A1 | 3/2009 | Tabata et al. |
| 2017/0313300 A1 | 11/2017 | Baba et al. |

FOREIGN PATENT DOCUMENTS

| | | |
|---|---|---|
| DE | 100 43 510 A1 | 3/2002 |
| DE | 10 2007 054 368 A1 | 6/2008 |

(Continued)

OTHER PUBLICATIONS

English Translation of the Written Opinion of the International Searching Authority for PCT/EP2020/080724. (Year: 2022).*

(Continued)

*Primary Examiner* — Calvin Cheung
(74) *Attorney, Agent, or Firm* — Crowell & Moring LLP

(57) ABSTRACT

A hybrid gearbox has a shift gearbox including at least one fixed ratio gear having a gear ratio both for the internal combustion engine and the electric motor-generator with respect to a power train connection, and speed superposition gearbox which is designed to provide a power-split gear having a variable speed ratio and a fixed torque ratio with respect to the internal combustion engine connection and the power train connection, wherein the variable speed ratio is formed by a modulation of a speed provided by the internal combustion engine on a speed provided by the electric motor-generator. The hybrid gearbox has at least one operating mode in which gear changes are only carried out between the fixed-ratio gear and the power-split gear.

13 Claims, 2 Drawing Sheets

(51) Int. Cl.
  *B60K 6/445* (2007.10)
  *B60K 6/547* (2007.10)
  *B60W 10/08* (2006.01)
  *B60W 10/111* (2012.01)
  *B60W 10/115* (2012.01)
  *B60W 30/19* (2012.01)

(52) U.S. Cl.
  CPC ........... *B60W 10/08* (2013.01); *B60W 10/111* (2013.01); *B60W 10/115* (2013.01); *B60W 30/19* (2013.01); *B60W 2510/1005* (2013.01); *B60W 2510/244* (2013.01); *B60W 2710/081* (2013.01); *B60W 2710/1005* (2013.01); *B60Y 2200/92* (2013.01)

(58) Field of Classification Search
  CPC ......... B60W 30/19; B60W 2510/1005; B60W 2510/244; B60W 2710/081; B60W 2710/1005; B60K 6/365; B60K 6/445; B60K 6/547; B60Y 2200/92
  See application file for complete search history.

(56) References Cited

FOREIGN PATENT DOCUMENTS

| | | |
|---|---|---|
| DE | 20 2009 007 972 U1 | 6/2010 |
| DE | 10 2017 130 920 A1 | 6/2019 |
| EP | 0 769 404 A1 | 4/1997 |
| JP | 2006-321392 A | 11/2006 |

OTHER PUBLICATIONS

International Search Report (PCT/ISA/210) issued in PCT Application No. PCT/EP2020/080724 dated Feb. 22, 2021 with English translation (five (5) pages).

Japanese-language Written Opinion (PCT/ISA/237) issued in PCT Application No. PCT/EP2020/080724 dated Feb. 22, 2021 (seven (7) pages).

German-language Search Report issued in German Application No. 10 2019 132 073.9 dated Sep. 4, 2020 with partial English translation (14 pages).

\* cited by examiner

HYBRID DRIVETRAIN, HYBRID GEARBOX, AND METHOD FOR OPERATING SAME

BACKGROUND AND SUMMARY

The invention relates generally to hybrid drives with a gearbox which, in one operating mode, is configured for rotational speed superposition between two drive machines provided for drive purposes, and to improving such drives. EP 0 769 404 A1 has disclosed a hybrid drive system having a rotational speed superposition gearbox.

The invention will be described below on the basis of a drivetrain for a passenger motor vehicle with an internal combustion engine and with an electric drive machine, so-called hybrid drive, but this is not to be understood as a limitation of the invention to such a use.

In motor vehicles with combustion engine drive, there is a need, in particular owing to the characteristic map (rotational speed, torque) of the drive machine and the power demand from driving operation, for a gearbox to be incorporated, with regard to the transmission of torque, between the drive machine and the final drive that transmits the drive forces to the roadway surface. A gearbox device may also be advantageous in the case of an electric motor drive. In the case of a hybrid drive with internal combustion engine and electromotive drive, the gearbox device commonly forms an important coupling element for the two drive machines. There are basically gearboxes with shiftable transformation ratios and gearboxes with continuously variable ratio. The controller of the gearbox, so-called gearbox controller, is intended here on the one hand to control the gearbox such that the driving requirements, such as acceleration, are met, and it is additionally intended that the drive machines output their drive power as efficiently as possible.

It is the object of the invention to specify a drivetrain having an internal combustion engine and an electric motor-generator as a drive machine, which outputs drive power to the motor vehicle drive in an efficient manner by means of a gearbox device with fixed-ratio gears and gears with variable ratio (power-split gears).

This object is achieved by means of a hybrid drivetrain according to various claims, a method for operating a hybrid drivetrain according to various claims, and by means of a hybrid gearbox according to various claims, and preferred refinements of the invention are in each case the subject matter of various claims.

The invention provides a hybrid drivetrain having a hybrid gearbox. This hybrid drivetrain has an internal combustion engine and an electric motor-generator for providing drive power for driving a motor vehicle. The hybrid drivetrain furthermore has a powertrain by means of which the drive power (rotational speed, torque) provided by the one or more drive machines and transmitted to the hybrid gearbox can be transmitted to at least one drivable drive wheel, wherein the drive wheel is configured for transmitting this drive power to a roadway surface. In the context of the invention, the powertrain is to be understood to mean a device for transmitting the drive power from the hybrid gearbox to the roadway surface.

The hybrid gearbox is furthermore configured to receive drive power of the internal combustion engine, so-called internal combustion engine drive power, and to receive drive power of the electric motor-generator, so-called electric drive power, and to output at least one of both types of drive power to the powertrain.

In a preferred embodiment, the hybrid drivetrain has a further electric motor-generator in addition to the electric motor-generator. The further electric motor-generator is preferably arranged downstream of the hybrid gearbox in a direction of torque transmission from the internal combustion engine to the powertrain. In particular, efficient operation is made possible by means of a further electric motor-generator.

The hybrid gearbox furthermore has at least three operating modes with different ratios, in particular rotational speed ratios, so-called gears. Here, in the context of the invention, a gear is to be understood to mean an operating mode of the hybrid gearbox, and such a gear accordingly does not necessarily have a single fixed ratio, as is the case in particular in a conventional manual gearbox, which has exclusively gears with in each case a single fixed ratio determined by the type of construction of the gearbox; rather, in the context of this invention, such a gear may duly have a single fixed ratio determined by the type of construction of the gearbox, but such a gear may also be characterized by a continuously variable ratio range. In the context of this invention, this characteristic of a fixed or continuously variable transformation ratio is used to distinguish between two different types of gear (fixed-ratio gear, power-split gear), wherein the at least three gears of the hybrid gearbox are formed from these at least two different types of gears.

To provide the two types of gears, the hybrid gearbox has two sub-gearboxes, one of which is a shift-capable gearbox, so-called shift gearbox, wherein this is configured to provide at least one of these three gears from the first type of gears, so-called fixed-ratio gear. A gear from the first type of gears (fixed-ratio gear) has a single transformation ratio, specified by the type of construction of the shift gearbox, for this gear. In this context, "determined by the type of construction of the gearbox" is to be understood in particular to mean that this transformation ratio is specified by one or more ratios of numbers of teeth of toothed wheels that are involved in the transmission of power in the hybrid gearbox. Such a transformation ratio is furthermore preferably effective for the transmission of power from the internal combustion engine, that is to say from the internal combustion engine connection, to the powertrain connection, and it is furthermore preferably the case that, in a fixed-ratio gear, in each case one fixed transformation ratio is effective for the transmission of power from the internal combustion engine connection to the powertrain connection and from the electric motor-generator connection to the powertrain connection. In particular, from a functional aspect, in such a fixed-ratio gear, the transformation ratio from the electric motor-generator to the powertrain connection is invariant, in particular is specified by one or more toothed-wheel pairings, and this is likewise the case from the internal combustion engine to the powertrain connection. Accordingly, a change in rotational speed of the electric motor-generator in such a fixed-ratio gear does not lead to a change in the rotational speed ratio of the internal combustion engine and the powertrain connection. Gearboxes for providing fixed-ratio gears are known per se in a large number of structural forms in the prior art, in particular of countershaft design, of planetary gearbox design or as so-called dual-clutch gearboxes.

The hybrid gearbox furthermore has a rotational speed superposition gearbox that is configured for providing at least one of these three gears from the second type of gears, so-called power-split gear. In the context of the invention, such a power-split gear is a gear with a variable rotational speed ratio and a fixed torque ratio with regard to the internal combustion engine connection and the powertrain connection. Since the rotational speed ratio in a power-split gear is continuously variable, a power-split gear has a transformation ratio range and is not restricted to a single fixed transformation ratio. Here, the (torque) transmission in the power-split gear from the internal combustion engine connection to the powertrain connection is fixedly specified by the type of construction of the gearbox, in particular by a ratio of numbers of teeth of toothed wheels that are involved in the transmission of power. By contrast, the rotational speed transformation ratio is made possible by rotational speed superposition by means of a rotational speed provided by the electric motor-generator at the electric motor-generator connection and a rotational speed provided by the internal combustion engine at the internal combustion engine connection, and this transformation ratio is furthermore continuously variable in a certain range in a manner dependent on the rotational speeds that can be provided by the drive machines (electric motor-generator, internal combustion engine). The rotational speed superposition gearbox can thus be regarded as a summing gearbox that connects both the internal combustion engine connection and the electric motor-generator connection to the powertrain connection for the purposes of transmitting torque. Here, the torque superposition gearbox is configured such that a variation of the rotational speed ratio of the internal combustion engine connection to the powertrain connection is made possible by means of a change in rotational speed at the electric motor-generator connection. Furthermore, a simple structural form for such a rotational speed superposition gearbox is a so-called epicyclic gearbox of planetary gearbox type of construction, which may generally also be regarded as a three-shaft or multi-shaft gearbox. From a functional aspect, it is thus possible for the variable, or continuously variable, rotational speed ratio in the hybrid gearbox (with regard to the rotational speed transformation ratio between the internal combustion engine connection and the powertrain connection), in particular in the rotational speed superposition gearbox, to be achieved by means of a rotational speed superposition of a rotational speed provided by the internal combustion engine and a rotational speed provided by the electric motor-generator. Here, from a control aspect, an adjustment of rotational speed of the electric motor-generator is easier to implement than an adjustment of rotational speed of the internal combustion engine, or in other words, the electric motor-generator is easier to control, with regard to the output rotational speed, than the internal combustion engine.

Furthermore, the hybrid drivetrain is configured such that the hybrid gearbox has at least one operating mode in which gear shifts can be performed only between gears of different types (fixed-ratio gear to power-split gear or power-split gear to fixed-ratio gear). In such an operating mode, a shift is accordingly always performed from a fixed-ratio gear to a power-split gear or vice versa. The hybrid drivetrain preferably has multiple operating modes, of which preferably one operating mode allows a gear shift between gears of the same type. Efficient and comfortable drive of the motor vehicle is made possible in particular with the proposed type of gear shifts between gears of different types. Furthermore preferably, a so-called rubber band effect is made possible, in the case of which in particular the rotational speed of the internal combustion engine is substantially decoupled from the traveling speed of the motor vehicle during an acceleration of the vehicle, and furthermore, in particular, sufficient launch acceleration or acceleration can be achieved.

Furthermore, a method is provided which is suitable for the operation of a hybrid gearbox with at least three gears. This method is furthermore preferably provided for controlling a hybrid gearbox in a hybrid drivetrain as described above. A hybrid gearbox that is controllable by way of the proposed method has an internal combustion engine connection for receiving drive power from an internal combustion engine and an electric motor-generator connection for receiving drive power from the electric motor-generator. The hybrid gearbox furthermore has a drivetrain connection for outputting drive power from one of these connections (electric motor-generator connection, internal combustion engine connection) or from both connections to a motor vehicle drivetrain. The method for controlling the hybrid gearbox is provided in particular for the shifting of gears, wherein the hybrid gearbox that is controllable by way of the method has at least three gears, and wherein at least one of these gears has a rotational speed transformation ratio between the internal combustion engine connection and the powertrain connection that is continuously variable by rotational speed superposition from the internal combustion engine connection and the electric motor-generator connection, so-called power-split gear.

Furthermore, this hybrid gearbox has at least one fixed-ratio gear in which there is in each case a fixed transformation ratio between the electric motor-generator connection and the powertrain connection and the internal combustion engine connection and the powertrain connection, and these transformation ratios are in each case fixedly specified by the type of construction of the hybrid gearbox, in particular by one or more ratios of numbers of teeth of a toothed-wheel pair or multiple toothed-wheel pairs that are involved in the transmission of torque from the internal combustion engine connection to the powertrain connection and/or from the electric motor-generator connection to the powertrain connection.

Here, for shifting from the at least one fixed-ratio gear into the at least one power-split gear or vice versa, the rotational speed transformation ratio of the power-split gear is set by means of the rotational speed superposition so as to correspond to the transformation ratio of the fixed-ratio gear with regard to the internal combustion engine connection and the powertrain connection. In particular, such an adaptation of the rotational speed transformation ratio during a gearshift leads to a comfortable shift.

In a preferred embodiment, at a time after the shift from the at least one fixed-ratio gear into the at least one power-split gear, the electric motor-generator is controlled such that it receives or outputs no or at least substantially no mechanical power; this control or demand can also be regarded as a power demand of zero. Such control may be implemented in particular with regard to the rotational speed or with regard to the torque. The electric motor-generator can preferably be electrically controlled, or braked, to a rotational speed of zero such that, although it possibly receives electrical power (voltage, current), it receives or outputs no mechanical power; this state can, as discussed, be referred to as a power demand of zero. In particular, a very slow rotation at the electric motor-generator, in particular of a few revolutions per minute, may also be understood in the context of the invention to mean a rotational speed of zero and thus a power demand of zero.

In particular in the power-split gear, in the case of the power demand of zero as discussed above, the rotational speed ratio corresponds to the (torque) ratio of this power-split gear, wherein, in particular, the (torque) ratio of the power-split gear cannot be influenced by the rotational speed superposition, and in this context is also referred to as ratio or transformation ratio.

It is furthermore preferable if, at the operating point of a power demand of zero, the electric motor-generator is controlled such that it receives or outputs no torque and thus receives or outputs no mechanical power. It is furthermore preferable if the rotational speed transformation ratio of the power-split gear with regard to the internal combustion engine connection and the powertrain connection is set, in particular by rotational speed superposition (rotational speed of the internal combustion engine with rotational speed of the electric motor-generator) during a gearshift from one of the fixed-ratio gears, such that this rotational speed transformation ratio of the power-split gear corresponds to the torque transformation ratio of the fixed-ratio gear from which a shift is performed into the power-split gear. In particular, such control of the electric motor-generator, and the enablement of the setting of a mechanical power of zero at the electric motor-generator (power demand of zero), or a mechanical power of virtually zero at the electric motor-generator, is made possible under the precondition of suitable selection of the transformation ratios, in particular ratio of numbers of teeth or diameter ratio, in the hybrid gearbox, because the rotational speed superposition is limited by the rotational speeds that can actually be implemented by the drive machines. In particular, a comfortable shift (gearshift) is achieved through such control of the electric motor-generator and configuration of the hybrid gearbox.

In a preferred embodiment of the invention, a method for operating a hybrid gearbox in one of the embodiments described above is proposed, wherein, in this variant of the method, at a time after the shift from the at least one fixed-ratio gear into the at least one power-split gear, a power demand on the electric motor-generator is ascertained or specified. Preferably, these power demands may be ascertained on the basis of specified parameters, wherein such parameters may be selected from a list, wherein this list comprises in particular the following parameters: state of charge of the energy store, acceleration demand, traveling speed, gradient on which the vehicle is moving, or the like. The power demand is preferably ascertained on the basis of a single parameter or multiple parameters, which are preferably included in the list. It is furthermore preferable if the rotational speed transformation ratio of the power-split gear with regard to the internal combustion engine connection and the powertrain connection is set by rotational speed superposition (rotational speed of the internal combustion engine and rotational speed of the electric motor-generator) such that this above-ascertained power demand (rotational speed, torque) is satisfied by the electric motor-generator. In particular, efficient operation of the hybrid drive is made possible through such control of the electric motor-generator.

In one preferred embodiment of the proposed method, the transformation ratio of the power-split gear, in particular during the transmission of power by means of the power-split gear (drive or recuperation), is controlled in a manner dependent on a state of charge of an electrical energy store, referred to as SOC, wherein the electric motor-generator can be supplied with energy from the abovementioned electrical energy store, or energy recuperated by the electric motor-generator can be stored in this electrical energy store. In particular, this energy store can thus be regarded as a so-called traction store. Furthermore, as discussed, the rotational speed transformation ratio can be influenced by means of the electric motor-generator, and the electric motor-generator is in this embodiment controlled such that, if a threshold value for this state of charge of the energy store is reached or undershot, the rotational speed transformation ratio of the power-split gear (with regard to the rotational speed ratio of internal combustion engine connection and powertrain connection) is set such that the electric motor-generator is operated in a generator operating mode or, in other words, the energy store is charged by means of the electric motor-generator if a specified state of charge is undershot. In particular, a load point shift of the internal combustion engine can be achieved through such control of the electric motor-generator, such that this is, in the case of a "low" SOC of the electrical energy store, used both for driving the vehicle and for charging the electrical energy store by means of the electric motor-generator, and efficient operation is thus made possible.

In one preferred embodiment of the method for operating a hybrid gearbox of the type described above, the transformation ratio of the power-split gear during the transmission of power by means thereof is controlled in a manner dependent on a further state of charge of an electrical energy store or of the abovementioned electrical energy store such that the rotational speed transformation ratio of the power-split gear (with regard to the internal combustion engine connection and the powertrain connection) is influenced by means of the electric motor-generator. Here, the electric motor-generator is controlled such that, if this further threshold value is reached or overshot, the rotational speed transformation ratio of the power-split gear is set such that the electric motor-generator is operated in a motor operating mode. In other words, in this operating mode based on the further threshold value, electrical power is taken from the electrical energy store, and the electric motor-generator is used exclusively, or in addition to the internal combustion engine, for driving the motor vehicle. In particular, efficient operation of the hybrid gearbox is made possible by way of one or both of the two stated threshold values.

In one preferred embodiment of the invention, a method for operating a hybrid gearbox is proposed, which method is intended for operating a hybrid gearbox in which, of the at least three gears, at least two gears are configured as fixed-ratio gears and at least one gear is configured as a power-split gear. The hybrid gearbox preferably has exactly three gears, of which two gears are fixed-ratio gears and one gear is a power-split gear. It is furthermore preferable if the rotational speed transformation ratio of the power-split gear is varied by rotational speed superposition of the internal combustion engine connection and of the electric motor-generator connection such that, with regard to the (torque) transformation ratio between the internal combustion engine connection and the powertrain connection, this rotational speed transformation ratio of the power-split gear lies between the transformation ratios of the two fixed-ratio gears adjacent to this power-split gear, which each have such a different (torque) transformation ratio, or corresponds to in each case one of these (torque) transformation ratios. In a regular operating mode of the hybrid gearbox, the proposed method varies the rotational speed transformation ratio of the power-split gear such that it is varied between the transformation ratios of the two fixed-ratio gears adjacent to this power-split gear, or may preferably correspond to in each case one of these. In particular, comfortable and efficient operation of the hybrid gearbox is made possible through such variation of the rotational speed transformation ratio of the power-split gear.

Furthermore, a hybrid gearbox is proposed that is operated in accordance with a method of the type described above. This hybrid gearbox preferably has a shift gearbox, in which shifts can be performed in discrete stages, such gearboxes commonly being referred to as shift gearboxes or shiftable gearboxes, and a rotational speed superposition gearbox with a continuously variable ratio, such gearboxes commonly being referred to as CVT (continuously variable transmission). The rotational speed superposition gearbox for providing the continuously variable ratio is preferably configured as an epicyclic gearbox with a planetary gearbox wheel set, and it is furthermore preferable for the rotational speed superposition gearbox to have at least one such epicyclic gearbox. In particular, such gearboxes are known from the prior art, but the proposed combination of the discussed control method and the abovementioned mechanical construction of the hybrid gearbox results in an efficient system.

In one preferred embodiment, the shift gearbox of the hybrid gearbox is configured as a so-called countershaft gearbox or preferably has at least one such countershaft gearbox. In particular, countershaft gearboxes with at least two shafts which are axially parallel and radially spaced apart from one another and on which toothed wheel pairs with different transformation ratios are arranged are known per se from the prior art and offer a space-saving option for providing the required "shift functionality" for the fixed-ratio gears.

In a further preferred embodiment of the invention, the shift gearbox of the hybrid gearbox is configured as a dual-clutch gearbox or preferably has such a dual-clutch gearbox. In particular, a large number of fixed-ratio gears can be realized in a small structural space by means of a dual-clutch gearbox.

In a further preferred embodiment, the shift gearbox of the hybrid gearbox is configured as an epicyclic gearbox, preferably as a planetary gearbox, and the shift gearbox furthermore preferably has such an epicyclic gearbox. In particular, a high power density can be achieved by means of an epicyclic gearbox.

In one preferred embodiment of the invention, the hybrid gearbox has a shift gearbox with at least two and preferably with a multiplicity of shiftable fixed-ratio gears. Furthermore, the rotational speed superposition gearbox of the hybrid gearbox is configured such that, between in each case two fixed-ratio gears or between all fixed-ratio gears, with regard to the transformation ratio, in each case one power-split gear can be implemented with this rotational speed superposition gearbox. For the possibility of implementing the power-split gears, consideration is given to the fact that both the internal combustion engine and the electric motor-generator can be operated only in a particular rotational speed range. In particular, with regard to the internal combustion engine, this rotational speed range in which it can be operated is greater than 200 rpm and preferably greater than 500 rpm, and this range is more preferably less than 20 000 rpm and preferably less than 10 000 rpm, and with regard to the electric motor-generator, the rotational speed range is greater than 0 rpm and preferably less than 100 000 and preferably less than 50 000 rpm and particularly preferably less than 25 000 rpm. More preferably, by means of the proposed method, the direction of rotation of the electric motor-generator can be changed. In particular, the structural embodiment of the hybrid gearbox makes it possible that, with regard to the transformation ratios, two adjacent fixed-ratio gears are separated from one another in each case by one power-split gear, and efficient and comfortable operation of the hybrid gearbox is thus made possible.

In one preferred embodiment, the hybrid gearbox has a brake device. This brake device is preferably arranged in or on the hybrid gearbox such that an output shaft of the electric motor-generator, which output shaft is configured for outputting and receiving mechanical power of the electric motor-generator, can be braked to a rotational speed of zero by means of this brake device. This brake device is preferably configured as a frictionally engaging, positively engaging or frictionally and positively engaging brake device. The brake device can preferably be used to prevent the electric motor-generator from receiving or outputting mechanical power (rotational speed of zero). In particular, by means of a brake device for braking or holding this output shaft, an efficient facility is created for braking the electric motor-generator to a rotational speed of zero and holding this electric motor-generator. The brake device should preferably be closed even if only a low power demand is placed on the electric motor-generator, wherein this low power demand is to be understood to mean a power of 5 kW or less and preferably of 2 kW or less and particularly preferably of 1 kW or less. It is preferable if no electrical power losses are caused in the electric motor-generator when the brake device is closed. The brake device is preferably configured as a "normally closed" brake device and requires no actuating forces in the closed state, such that efficient operation is made possible in this state, and it is furthermore preferable if the brake device is configured as a so-called "normally open" clutch and requires no actuating forces in the open state, such that efficient operation is made possible in this state.

The invention and individual features thereof will be discussed in more detail below on the basis of the figures.

DETAILED DESCRIPTION

Figure 1:
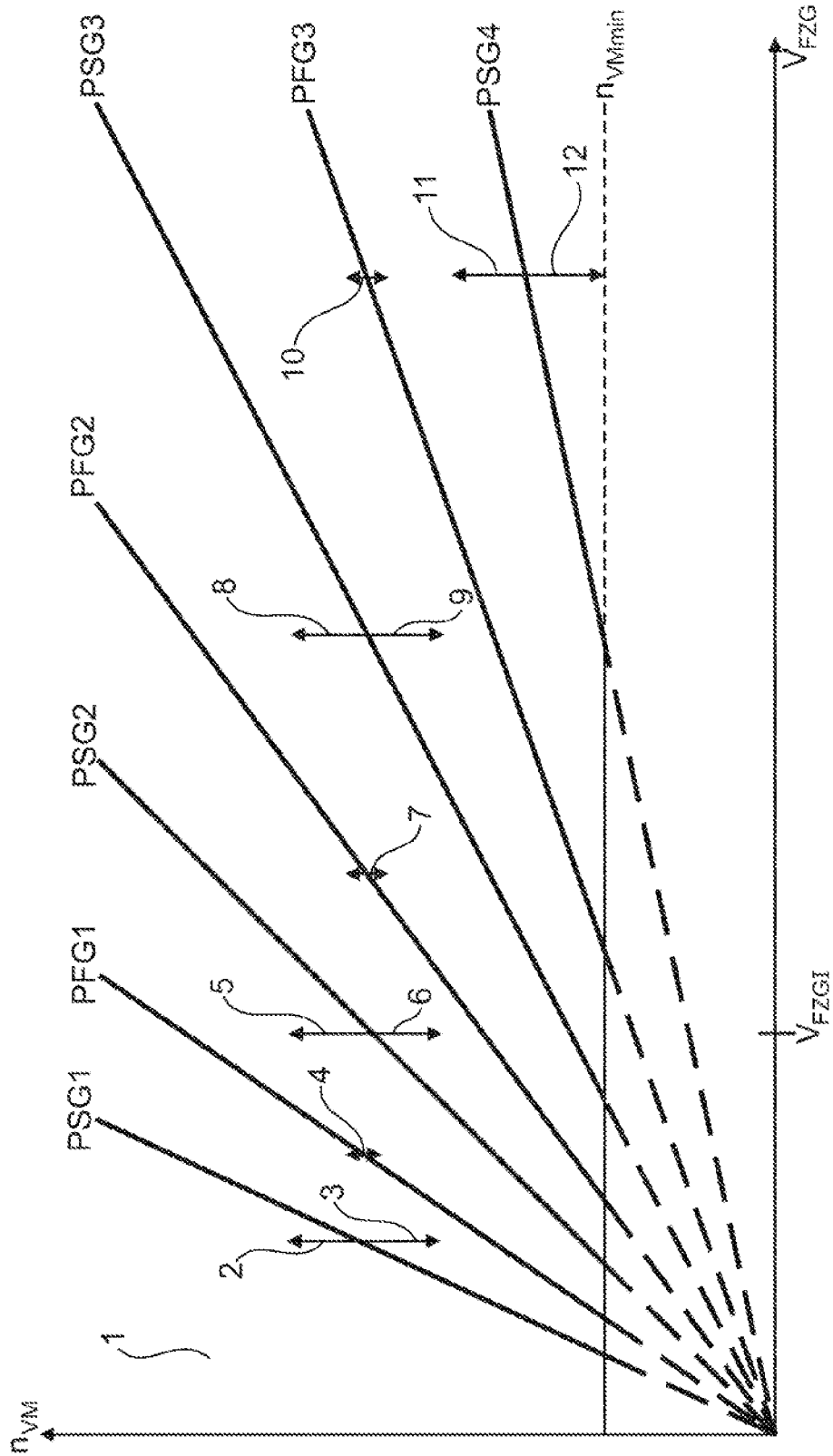
FIG. 1 shows a method for operating a hybrid drivetrain with fixed-ratio and power-split gears, FIG. 2 schematically shows a hybrid drive system.

The disclosure is concerned with a hybrid drive with a DHT (Dedicated Hybrid Transmission) gearbox; such a hybrid drive has both parallel-hybrid power paths (fixed-ratio gear) and power-split power paths (power-split gear), and thus contrasts with known so-called P2 hybrid drives, which have a series of fixed-ratio gears and which perform shift operations between these parallel-hybrid power paths by means of the power-split power paths instead of friction clutches.

The known P2 hybrid drive accordingly has exclusively power paths with fixed ratios (fixed-ratio gears) in which a torque transformation ratio and a rotational speed transformation ratio are invariantly specified by the type of construction of the force-transmitting means, in particular of the gearbox. Here, a load point shift of the combustion motor drive machine (internal combustion engine) is performed through the adjustment of the torque loading applied to the internal combustion engine; this influencing is achieved by means of the electric motor-generator, that is to say by whether and to what degree the electric motor-generator is operated in the generator or motor operating mode. The drive system of known hybrid vehicles generally has a single power-split power path (power-split gear), in which the electric motor-generator and internal combustion engine are coupled via a three-shaft gearbox to the powertrain. In this power-split gear, one possible control strategy is to operate the internal combustion engine in the most optimal possible operating range, in particular with regard to the fuel consumption in relation to the output power; this operating range is set on the basis of the driver demand (vehicle speed, acceleration etc.) and is achieved by rotational speed superposition from the electric motor-generator.

It is thus evident that a hybrid drive with power-split gear has hitherto been operated in a manner that is intended to realize efficient operation of the internal combustion engine, wherein, for this purpose, the internal combustion engine rotational speed and thus the drive noise that is perceptible to the vehicle occupants are decoupled from the vehicle speed. For example, a vehicle acceleration is possible with constant or decreasing rotational speed of the internal combustion engine; in the case of a conventional vehicle drive with shiftable gearbox, it is the case during vehicle acceleration that the internal combustion engine rotational speed increases proportionally to the vehicle speed in each individual gear. When drive is being provided with a power-split gear (internal combustion engine rotational speed decoupled from the vehicle speed), the behavior of the drive is thus difficult for occupants of the vehicle to understand, and the vehicle gives the subjective impression of being undynamic, and the hybrid drive can ultimately also seem restless. As discussed, the rotational speed of the internal combustion engine may vary greatly with the driver demand and scarcely with the vehicle speed; this subjective impression can be referred to as the "rubber band effect", and is undesired.

By contrast, the present disclosure proposes the operating strategy illustrated schematically and discussed in more detail in FIG. 1. Here, this operating strategy is based on the fact that a hybrid drivetrain with fixed-ratio gears and power-split gears is provided. The power-split gears are in this case to be used similarly to parallel-hybrid power paths with rotational speed superposition and variable rotational speed ratio of internal combustion engine to powertrain (hybrid gearbox output); here, however, one criterion for the control of the rotational speed of the electric motor-generator may be the state of charge of the electrical store. This means that, in one or more power-split gears, in the event that no demand for charging/discharging of the electrical store is present, that is to say the SOC lies within specifiable limits, the rotational speed ratio of the internal combustion engine must be adjusted to the value of the (torque) ratio of the active power-split gear.

Based on the present disclosure, the rotational speed ratio of the internal combustion engine in the active power-split gear is preferably varied only in a manner dependent on the demand for charging/discharging of the electrical store (SOC). In the case of a size of the electrical store of more than 10 kWh, such as is conventional in motor vehicles with hybrid drive, this process is relatively slow, such that the rotational speed of the internal combustion engine continues to change substantially in relation to the vehicle speed even in the power-split gear. The discussed rubber band effect is avoided through this control method. In particular, in a driving situation in which the rotational speed adjustment (by charging/discharging) reaches the transformation ratio of a fixed-ratio gear adjacent to the active power-split gear, no further adjustment of the rotational speed ratio of the internal combustion engine is performed by rotational speed superposition from the electric motor-generator. Instead of the rotational speed superposition, which is no longer performed, a gearshift is performed from the power-split gear into that specific fixed-ratio gear whose transformation ratio has been reached; thus, at this moment, the rotational speed ratio of the power-split gear corresponds to the ratio of the fixed-ratio gear into which a shift is being performed. After the fixed-ratio gear has been engaged, a load point shift of the internal combustion engine is performed, if specified by the operating strategy, by way of an adaptation of the load or of the torque (the electric motor is operated correspondingly as a motor or as a generator). If the demand for charging/discharging at the electrical store increases further, such that a further load point shift can no longer be imparted by the electric motor-generator (rotational speed and/or torque limit of the electric motor-generator is reached), then the operating method intervenes with a new shift operation, and performs a shift operation from this fixed-ratio gear into a power-split gear. By way of the corresponding upshifts and downshifts into another gear with lower/higher ratio, it is made possible for the internal combustion engine to be set to the required power point.

In other words, in the case of a shift logic known from the prior art, the operating method for a gearbox uses the driver demand (in particular accelerator pedal position), demand for charging/discharging of the store (in particular SOC lies within/outside specifiable threshold values) and further boundary conditions (in particular temperatures, low emission zone, planned traveling route, etc.) to ascertain the optimum gear of the gearbox in order to achieve the lowest consumption whilst satisfying the driver demand.

In the present disclosure, in the case of parallel-hybrid power paths (so-called fixed-ratio gear, fixed rotational speed and torque ratio for internal combustion engine and electric motor-generator in each case in relation to the powertrain connection), the balancing of the torques takes place as is known from the prior art (load point shift of the internal combustion engine toward efficient operation by way of electric motor-generator torque). Furthermore, when the power-split gear is active, the rotational speed of the internal combustion engine that is to be set is ascertained from the (torque) ratio, also referred to for short as ratio, of the active power-split gear, from the present vehicle speed, and from the present motor/generator demand on the electric machine that is involved in the power-split power path. In other words, from the motor/generator demand on the electric motor-generator (corresponding mechanical power) and the torque that is presently to be provided by the internal combustion engine in order to satisfy the drive power demanded at the gearbox output, so-called powertrain connection, a rotational offset is ascertained which is to be added to the vehicle-speed-dependent rotational speed. The rotational speed of the internal combustion engine that is thereupon to be set is in this case limited to that for the adjacent gears (next lower/higher ratio) of the hybrid gearbox and the rotational speed operating limits of internal combustion engine and electric motor-generator. If the next lower/higher ratio is reached, then a shift must be performed from the power-split gear to the corresponding parallel-hybrid gear (fixed-ratio gear), and the control method then again follows in accordance with the above-discussed load point shift at the internal combustion engine by way of a provision of torque by the electric motor-generator.

FIG. 1 schematically illustrates a method for controlling a hybrid gearbox with four power-split gears (PSG1 to PSG4) and three fixed-ratio gears (PFG1 to PFG3). Here, the rotational speed of the internal combustion engine $n_{VM}$ is plotted versus the vehicle speed $v_{FZG}$. In a fixed-ratio gear (PFG1 to PFG3), the vehicle speed $v_{FZG}$ is fixedly coupled to the rotational speed of the internal combustion engine $n_{VM}$, that is to say, during an acceleration in the first fixed-ratio gear PFG1, the internal combustion engine rotational speed can be uniquely read off at a given vehicle speed $v_{FZG}$. A load point shift 4 is achieved by provision of torque by the electric motor-generator (by motor/generator action), but this does not change the rotational speed ratio of the internal combustion engine connection to the powertrain connection. The same applies to the load point shift 7 and 10 in the second fixed-ratio gear PFG2 and third fixed-ratio gear PFG3. The load point shifts 4, 7, 10 are illustrated as points but may take place along the respective fixed-ratio gear (PFG1 to PFG3) and are not coupled to a particular speed or a particular rotational speed.

An entirely different situation is encountered in the power-split gears, in which the rotational speed of the internal combustion engine $n_{VM}$ can be decoupled from the vehicle speed $v_{FZG}$ by rotational speed superposition from the electric motor-generator. If the electric motor-generator is operated in the generator mode, decoupling of the rotational speed takes place in direction 2, and if this electric motor-generator is operated in motor mode, decoupling takes place in the direction 3. This applies correspondingly to the other power-split gears (second power-split gear PSG2, third-split gear PSG3, fourth power-split gear PSG4); decoupling of the rotational speed in the direction 5, 8 or 11 signifies a generator mode of the electric motor-generator in each case, and decoupling in the opposite direction, that is to say direction 6, 9 or 12, signifies motor operation. Operation along the lines for the power-split gears (PSG1 to PSG4) signifies a power demand of zero at the electric motor-generator; in such an operating mode, the brake device for braking the output shaft of the electric motor-generator can be closed, and the rotational speed of zero can be specified for this shaft.

In the indicated directions that show the decoupling of the rotational speed, the method for controlling the hybrid gearbox can be seen for a movement of the vehicle at constant speed ($v_{FZG}$). If it is assumed that the electrical store is fully charged and the vehicle is moving constantly at the vehicle speed $v_{FZGI}$, the electric motor-generator is operated in motor mode. As the electrical store discharges, the decoupling of the rotational speed moves vertically in the motor range (below the PSG2 line) into the range for the generator mode (above the PSG2 line), and, if the PSG line is crossed, the electric motor-generator is operated in generator mode. If, at the vehicle speed $v_{FZGI}$ indicated by way of example, one of the fixed-ratio gears is reached by way of the adjustment of the rotational speed ratio in the power-split gear, then a gear shift is performed into the fixed-ratio gear that is reached, that is to say into one of the fixed-ratio gears (PFG1 or PFG2) that is adjacent to the second power-split gear PSG2. As already discussed, in the fixed-ratio gears (PFG1 to PFG3), an increase in efficiency of the drive can be achieved by means of a load point shift at the internal combustion engine by means of the torque provided (by motor or generator action) by the electric motor-generator; in any case, in each individual fixed-ratio gear, a vehicle speed is fixedly assigned to a rotational speed of the internal combustion engine $n_{VM}$.

Figure 2:
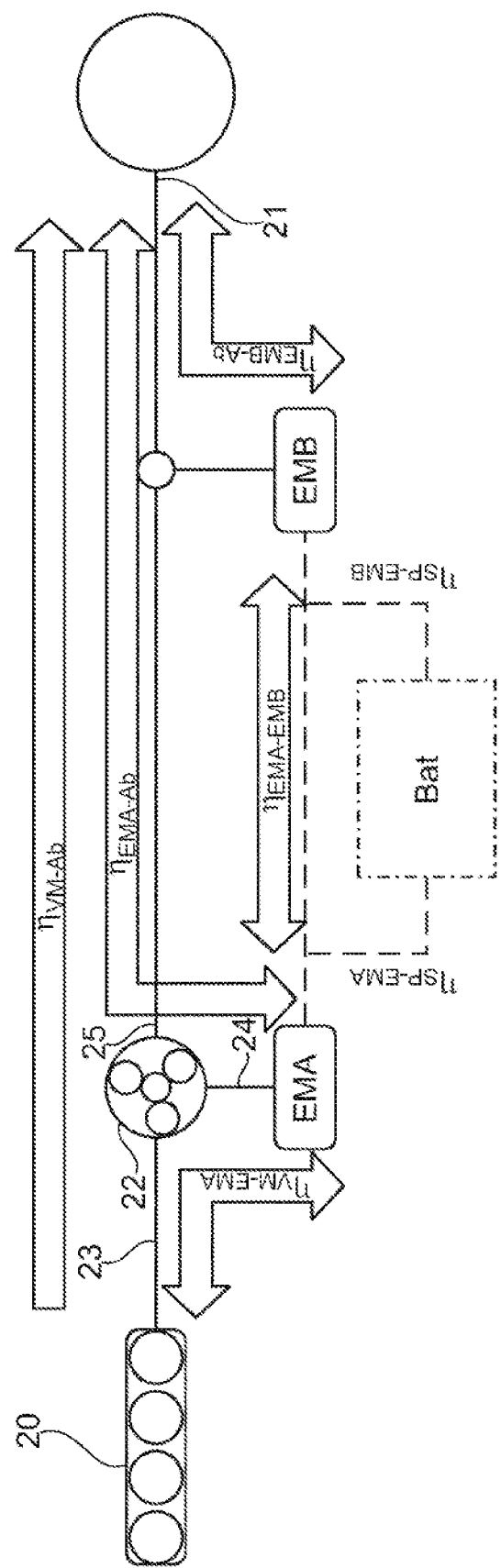

FIG. 2 illustrates a hybrid drivetrain which has an internal combustion engine 20 and a powertrain 21 for transmitting the drive power provided by the internal combustion engine 20 and by the electric motor-generator EMA to a roadway surface. The hybrid drivetrain furthermore also has a further electric motor-generator EMB, which is arranged downstream of the hybrid gearbox 22 in the direction of torque transmission from the internal combustion engine 20 to the powertrain 21. In the schematic illustration, it can be seen how the drive machines (20, EMA) and the powertrain 21 are coupled to one another via the internal combustion engine connection 23, the electric motor-generator connection 24 and the powertrain connection 25.

Efficient operation of the hybrid drivetrain is made possible by the arrangement of the further electric motor-generator EMB downstream of the hybrid gearbox 22 that has fixed-ratio gears and power-split gears, because drive power transmitted from this further electric motor-generator EMB, and drive power recuperated thereby, is subject to the efficiency $\eta_{EMB\text{-}Ab}$, and therefore no efficiency losses in the hybrid gearbox affect this drive power. The electrical power generated by the further electric motor-generator can be fed therefrom into the electrical store Bat, or taken from the latter, with the efficiency $\eta_{SP\text{-}EMB}$. It is furthermore also made possible for electrical power to be exchanged directly between the electric motor-generator EMA and the further electric motor-generator EMB with the efficiency $\eta_{EMA\text{-}EMB}$.

Where drive power is transmitted from the internal combustion engine 20 to the powertrain 21, this is transmitted via the hybrid gearbox 22 with the efficiency $\eta_{VM\text{-}Ab}$; a recuperation of drive power by the internal combustion engine, which is of reciprocating-piston design, is in principle not possible. Drive power can be fed from the internal combustion engine 20 via the hybrid gearbox 22 to the electric motor-generator EMA and vice versa with the efficiency $\eta_{VM\text{-}EMA}$, and drive power can be provided, with this efficiency ($\eta_{VM\text{-}EMA}$), for driving the electric motor-generator.

The electric motor-generator EMA, too, can recuperate drive power and feed this into the electrical store Bat or be supplied with electrical power from the latter; these power flows are each subject to the efficiency $\eta_{SP\text{-}EMA}$.

As discussed, different power flows with different efficiencies are obtained, which, by means of the proposed hybrid gearbox, the proposed method for controlling the hybrid gearbox and by means of a hybrid drivetrain having such a hybrid gearbox, allow efficient operation of a motor vehicle.

REFERENCE DESIGNATIONS

1 Launch range
2 Decoupling of the rotational speed of the internal combustion engine $n_{VM}$ from the vehicle speed $v_{FZG}$, direction of generator operation of the electric motor-generator in the first power-split gear PSG1
3 Decoupling of the rotational speed of the internal combustion engine $n_{VM}$ from the vehicle speed $v_{FZG}$, motor operation of the electric motor-generator in the first power-split gear PSG1
4 Load point shift in the first fixed-ratio gear PFG1 by means of torque from electric motor-generator
5 Decoupling of the rotational speed of the internal combustion engine $n_{VM}$ from the vehicle speed $v_{FZG}$, direction of generator operation of the electric motor-generator in the second power-split gear PSG2
6 Decoupling of the rotational speed of the internal combustion engine $n_{VM}$ from the vehicle speed $v_{FZG}$, motor operation of the electric motor-generator in the second power-split gear PSG2
7 Load point shift in the second fixed-ratio gear PFG2 by means of torque from electric motor-generator
8 Decoupling of the rotational speed of the internal combustion engine $n_{VM}$ from the vehicle speed $v_{FZG}$, direction of generator operation of the electric motor-generator in the third power-split gear PSG3
9 Decoupling of the rotational speed of the internal combustion engine $n_{VM}$ from the vehicle speed $v_{FZG}$, motor operation of the electric motor-generator in the third power-split gear PSG3

10 Load point shift in the third fixed-ratio gear PFG3 by means of torque from electric motor-generator
11 Decoupling of the rotational speed of the internal combustion engine $n_{VM}$ from the vehicle speed $v_{FZG}$, direction of generator operation of the electric motor-generator in the fourth power-split gear PSG4
12 Decoupling of the rotational speed of the internal combustion engine $n_{VM}$ from the vehicle speed $v_{FZG}$, motor operation of the electric motor-generator in the fourth power-split gear PSG4
$v_{FZG}$ Vehicle speed
$v_{FZGI}$ A vehicle speed in the second power-split gear PSG2
$n_{VM}$ Rotational speed of the internal combustion engine
PSG1 to Power-split gear 1 to 4
PSG4
PFG1 to Fixed-ratio gear 1 to 3
PFG4
20 Internal combustion engine
21 Powertrain
22 Hybrid gearbox
23 Powertrain connection
24 Electric motor-generator connection
25 Powertrain connection

The invention claimed is:

1. A hybrid drivetrain comprising:
a hybrid gearbox;
an internal combustion engine;
an electric motor-generator; and
a powertrain with at least one drivable drive wheel,
wherein the hybrid gearbox is configured to:
  receive internal combustion engine drive power of the internal combustion engine;
  receive electric drive power of the electric motor-generator; and
  output at least one of the internal combustion engine drive power or the electric drive power to the powertrain,
wherein the hybrid gearbox comprises:
  at least three gears;
  a shift gearbox configured to provide at least one fixed-ratio gear as at least one of the three gears, wherein the at least one fixed-ratio gear comprises one ratio specified by the type of construction of the shift gearbox both for the internal combustion engine and for the electric motor-generator with regard to the powertrain connection; and
  a rotational speed superposition gearbox configured to provide at least one power-split gear as at least one other of the three gears, wherein the at least one power-split gear comprises a variable rotational speed ratio and a fixed torque ratio with regard to the internal combustion engine connection and the powertrain connection, wherein the variable rotational speed ratio in the hybrid gearbox is formed by a rotational speed superposition of a rotational speed provided by the internal combustion engine and a rotational speed provided by the electric motor-generator,
  wherein the hybrid gearbox is configured to operate in at least one operating mode in which gear shifts can be performed only between the fixed-ratio gear and the power-split gear.

2. A method for operating a hybrid gearbox, the method comprising:
receiving, via an internal combustion engine connection of the hybrid gearbox, drive power from an internal combustion engine;
receiving, via an electric motor-generator connection of the hybrid gearbox, drive power from an electric motor-generator; and
outputting, via a powertrain connection of the hybrid gearbox, drive power from at least one of the internal combustion engine connection or the electric motor-generator connection to a motor vehicle drivetrain;
wherein the hybrid gearbox comprises:
  at least three gears, wherein at least one of the three gears is a power-split gear that has a rotational speed ratio between the internal combustion engine connection and the powertrain connection that is continuously variable by rotational speed superposition from the internal combustion engine connection and the electric motor-generator connection, and
  wherein at least one other of the at least three gears is a fixed-ratio gear having a fixed transformation ratio between the electric motor-generator connection and the powertrain connection and the internal combustion engine connection and the powertrain connection, wherein the transformation ratio is specified by a type of construction of the hybrid gearbox, and
wherein the method further comprises:
  shifting at least one of from the fixed-ratio gear into the power-split gear or from the power-split gear into the fixed-ratio gear; and
  setting the rotational speed transformation ratio of the power-split gear during the shifting so as to correspond to the transformation ratio of the fixed-ratio gear with regard to the internal combustion engine connection and the powertrain connection.

3. The method according to claim 2, further comprising:
after shifting from the fixed-ratio gear into the power-split gear:
  controlling the electric motor-generator such that it receives or outputs no mechanical power; and
  setting the rotational speed transformation ratio of the power-split gear by rotational speed superposition so as to correspond to a torque transformation ratio of the fixed-ratio gear from which a shift is performed into the power-split gear.

4. The method according to claim 2 further comprising:
after shifting from the fixed-ratio gear into the power-split gear:
  ascertaining a power demand on the electric motor-generator; and
  setting the rotational speed transformation ratio of the power-split gear by rotational speed superposition such that the power demand is satisfied by the electric motor-generator.

5. The method according to claim 2 further comprising:
controlling the transformation ratio of the power-split gear during transmission of power through the power-split gear in a manner dependent on a state of charge of an electrical energy store, wherein the electrical energy store supplies energy to the electric motor-generator;
determining that a threshold value for the state of charge of the energy store is reached or undershot; and
responsively setting the transformation ratio of the power-split gear such that the electric motor-generator is operated in a generator operating mode.

6. The method according to claim 2, further comprising:
controlling the transformation ratio of the power-split gear during transmission of power through the power-split gear in a manner dependent on a state of charge of an electrical energy store, wherein the electrical energy store supplies energy to the electric motor-generator;

determining that a threshold value for the state of charge of the energy store is reached or undershot; and responsively setting the transformation ratio of the power-split gear such that the electric motor-generator is operated in a motor operating mode.

7. The method according to claim 2, wherein at least two gears of the at least three gears are configured as fixed-ratio gears and at least one gear of the at least three gears is configured as the power-split gear, and wherein the method further comprises:

varying the rotational speed transformation ratio of the power-split gear by rotational speed superposition of the internal combustion engine connection and of the electric motor-generator connection such that, with regard to a torque transformation ratio between the internal combustion engine connection and the powertrain connection, the rotational speed transformation ratio of the power-split gear is between the transformation ratios of the two fixed-ratio gears adjacent to the power-split gear, or corresponds to in each case to one of these transformation ratios.

8. A hybrid gearbox comprising:

an internal combustion engine connection configured to receive drive power from an internal combustion engine;

an electric motor-generator connection configured to receive drive power from an electric motor-generator;

a powertrain connection configured to output drive power from at least one of the internal combustion engine connection or the electric motor-generator connection to a motor vehicle drivetrain;

at least three gears, wherein at least one of the three gears is a power-split gear that has a rotational speed ratio between the internal combustion engine connection and the powertrain connection that is continuously variable by rotational speed superposition from the internal combustion engine connection and the electric motor-generator connection, and wherein at least one other of the at least three gears is a fixed-ratio gear having a fixed transformation ratio between the electric motor-generator connection and the powertrain connection and the internal combustion engine connection and the powertrain connection, wherein the transformation ratio is specified by a type of construction of the hybrid gearbox;

a shift gearbox, configured to perform shifts in discrete stages; and a rotational speed superposition gearbox with a continuously variable ratio, wherein the rotational speed superposition gearbox comprises an epicyclic gearbox with a planetary gearbox gear set.

9. The hybrid gearbox according to claim 8, wherein the shift gearbox comprises a countershaft gearbox.

10. The hybrid gearbox according to claim 8, wherein the shift gearbox comprises a dual-clutch gearbox.

11. The hybrid gearbox according to claim 8, wherein the shift gearbox comprises an epicyclic gearbox.

12. The hybrid gearbox according to claim 8, wherein the shift gearbox has at least three or more shiftable fixed-ratio gears, and wherein the rotational speed superposition gearbox is configured such that, between at least adjacent two fixed-ratio gears, with regard to the transformation ratio, one power-split gear can be implemented with the rotational speed superposition gearbox, such that, with regard to the transformation ratios, the at least two adjacent fixed-ratio gears are separated from one another in each case by one power-split gear.

13. The hybrid gearbox according to claim 8, further comprising:

a brake device configured to break an output shaft of the electric motor-generator to a rotational speed of zero.

* * * * *